July 17, 1934.  W. P. COUSINO  1,967,190
SYNCHRONIZING DEVICE
Filed April 18, 1930   2 Sheets-Sheet 1

INVENTOR
WALTER P. COUSINO.
BY
ATTORNEY

July 17, 1934.  W. P. COUSINO  1,967,190
SYNCHRONIZING DEVICE
Filed April 18, 1930   2 Sheets-Sheet 2

INVENTOR
WALTER P. COUSINO.
BY
ATTORNEY

Patented July 17, 1934

1,967,190

UNITED STATES PATENT OFFICE 1,967,190

SYNCHRONIZING DEVICE

Walter P. Cousino, Detroit, Mich., assignor to Chrysler Corporation, Detroit, Mich., a corporation of Delaware Application April 18, 1930, Serial No. 445,467

6 Claims. (Cl. 192—53)

This invention relates to an improved clutch element synchronizer, particularly for vehicle transmissions.

The main objects of this invention are to provide an improved synchronizer which may be conveniently embodied in a transmission of substantially standard construction; to provide a frictionally operative device of this kind having a carefully ground surface adapted to seat upon a similarly prepared continuous surface of an associated clutch element so as to obviate engagement of the synchronizer with the hardened teeth of the clutch element and to present a surface of substantial area for the device to work upon; to provide a resilient split band on one clutch element of a transmission of this kind which is adapted to operate internally upon an associated clutch element thereof; to provide a self energizing, frictionally acting band of this kind which is expanded by relative movement of the driving and driven clutch elements of a transmission as said elements are moved towards each other so as to augment the force with which the band is held against its seat; and to provide yieldable means for forming a frictional driving connection between the driving and driven clutch elements of a transmission as they are moved towards each other which will permit the teeth of the elements to be meshed together by the application of a slight pressure on one element after said elements are rotated substantially in synchronism with each other by the frictional means.

An illustrative embodiment of my invention is shown in the accompanying drawings, in which.

Figure 1:
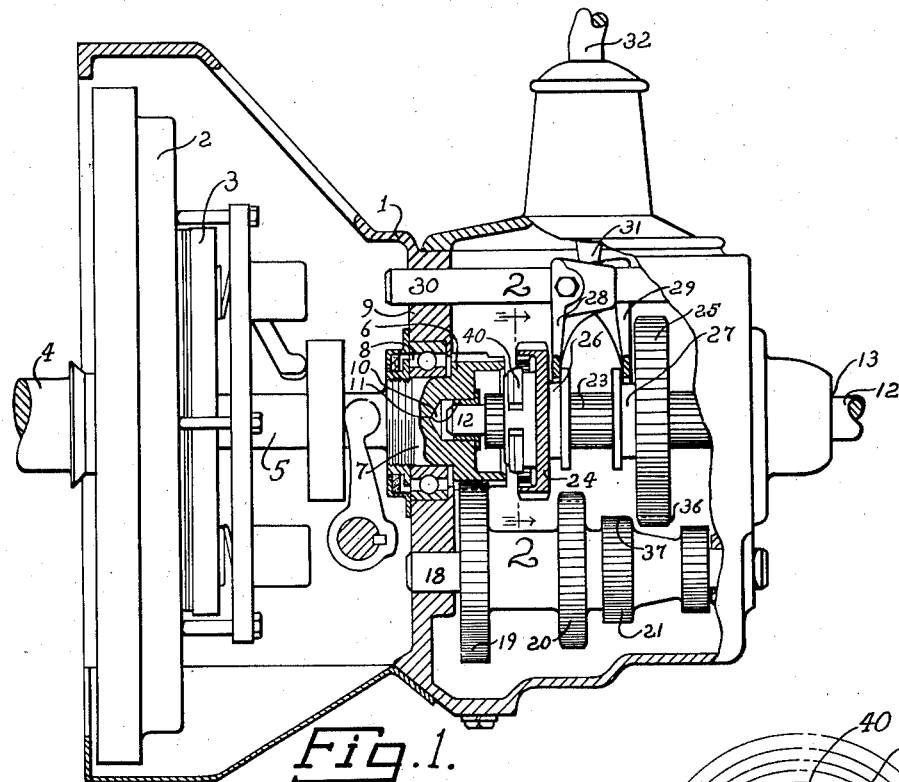
Fig. 1 is a vertical section of a vehicle transmission embodying my invention.

In the form shown in Figs. 1 to 4 inclusive, my improved synchronizing device is illustrated in connection with transmission mechanism of the type used in motor vehicles but it is understood that synchronizers of substantially the same construction shown may be advantageously employed in machines of any kind in which driving and driven clutch elements are meshed together while they are rotating.

The transmission mechanism is enclosed within a housing 1 which also encloses driving and driven clutch members 2 and 3. The driving clutch member 2 is rigidly connected with the rear end of a crank shaft 4 and the driven clutch member 3 is splined on a driven shaft 5 of the transmission. Provided on the rear end of the driven shaft 5 is a driving clutch member 6 which has a hub part 7 journaled in a bearing 8 that is supported by a transverse wall or partition 9 of the housing 1.

The outer end of the driving clutch member 6 has a central aperture 10 having a bearing 11 therein in which the forward end of a driven transmission shaft 12 is journaled, the other end of the shaft being journaled at 13 in the housing 1. Formed in the rear side of the clutch member 6 is a recess 14 which is substantially concentric with the central aperture 10 and which provides a peripheral overhanging flange 15. The outer extremity of the inner periphery of the flange 15 has a ground beveled seat 16 and the outer periphery of the flange 15 is provided with clutch teeth 17.

The transmission mechanism also includes a countershaft 18 having gears 19, 20 and 21 thereon. Teeth 22 formed on the forward part of the driving clutch member 6 are permanently meshed with the teeth of the gear 19 of the countershaft 18.

The intermediate part of the driven shaft 12 of the transmission has splines 23 formed thereon on which a clutch member 24 and a gear 25 are shiftably mounted. The clutch member 24 and gear 25 are provided with hubs having grooves 26 and 27 therein into which extend gear shifter forks 28 and 29 carried by the gear shifter shafts 30. The lower end 31 of a gear shift lever 32 coacts with the shafts 30 for changing the setting of the gears.

The clutch member 24 has a peripheral flange 33 on its inner side on which teeth 34 are formed for meshing with the teeth 17 of the driving clutch member 6. The outer periphery of the gear 24 has teeth 35 thereon which are adapted to mesh with the teeth of the gear 20 on the countershaft 18 and the gear 25 is provided with teeth 36 which are adapted to mesh both with the teeth 37 of the gear 21 and with teeth of a reversing gear not shown. With the above gear shifting mechanism the clutch member 24 may be selectively placed in a high speed, direct, positive driving position by shifting it to the left as viewed in Fig. 1 until the teeth 34 mesh with the teeth 17 of the driving clutch member 6. When the clutch member 24 is shifted to the right as viewed in Fig. 1 it is brought into mesh with the gear 20 of the countershaft 18 thereby producing a second speed setting of the transmission.

Formed on the clutch member 24 is a hub part 38 which is located in registration with the recess 14 of the driving clutch member 6 and adapted to fit thereinto. The hub part 38 has an incomplete peripheral groove 39 therein in which a resilient, yieldable split band 40 is seated. The extremities of the groove 39 are separated by a lug 41 which engages one end of the band and limits rotation thereof with respect to the hub part 38. The band 40 has a ground beveled edge portion 42 registering with the ground beveled seat 16 of the clutch member 6 which engages the seat when the clutch member 24 is shifted to the left, as viewed in Fig. 1, before the teeth 17 and 34 of the clutch members 6 and 24 respectively are meshed together.

Figure 5:
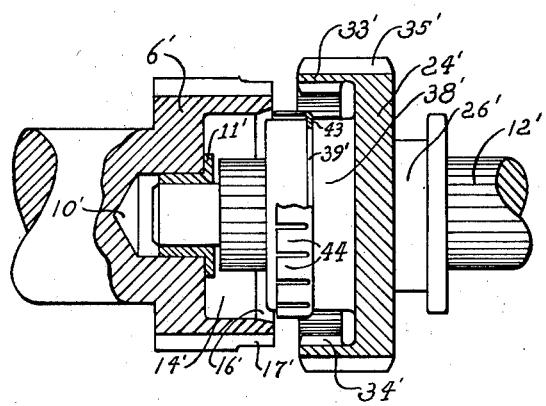
Fig. 5 is a fragmentary section of coacting driving and driven clutch elements showing a modified form of my invention.
Figure 2:
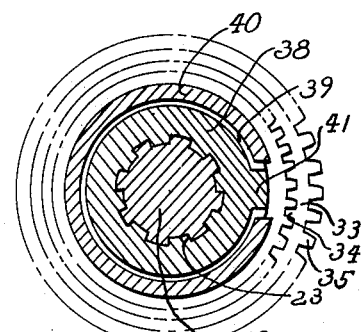
Fig. 2 is a transverse section taken on line 2—2 of Fig. 1.
Figure 3:
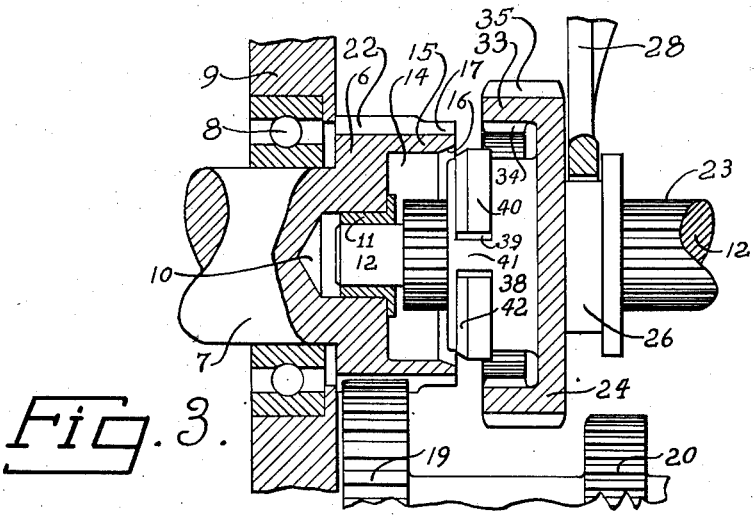
Fig. 3 is an enlarged fragmentary section showing the clutch element synchronizer in detail.
Figure 4:
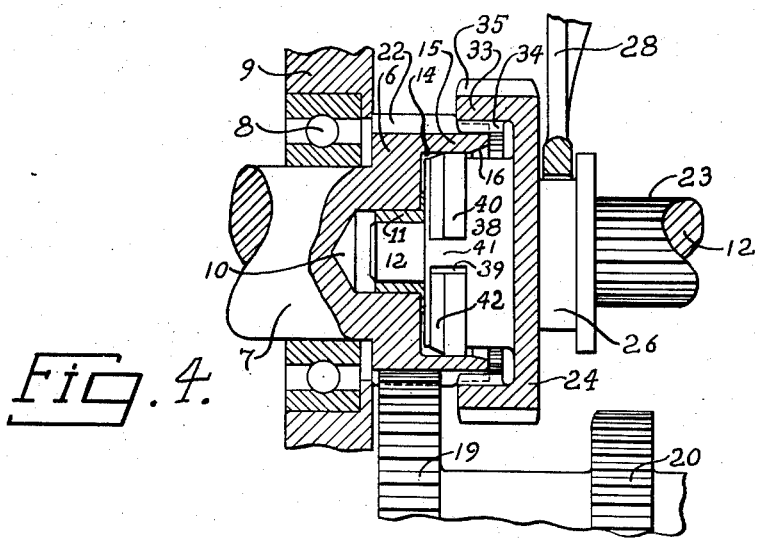
Fig. 4 is a view similar to Fig. 3 showing the parts of the synchronizer in a different position.

In the form shown, in Fig. 5, the driving clutch member 6' has a central aperture 10' in which a bearing 11' is located for rotatably supporting one end of a driven shaft 12'. Shiftably mounted on the shaft 12' is a driven clutch member 24' having teeth 35' on its outer periphery. The clutch member 24' has a peripheral flange 33' on the inner side on which teeth 34' are formed. Teeth 17' are formed on the outer periphery of the clutch member 6' and are adapted to mesh with the teeth 34' of the clutch member 24'.

The clutch member 24' has a hub 38' which registers with a recess 14' in the driving clutch member 6' and which is adapted to fit therein when the clutch members are in meshed relation. Seated in a groove 39' of the hub 38' is a ring 43 which has resilient fingers 44 extending axially of the shaft 12' in the direction of the recess 14'. The peripheral wall of the recess 14' has a ground beveled seat 16' against which the resilient fingers 44 bear when the clutch members are moved toward their meshed position so as to provide a frictional driving connection between the clutch members which synchronizes the speed of rotation thereof before the teeth 17' and 34' are brought together.

In operation, when the clutch member 24 is shifted towards its high speed position the ground edge portion 42 of the band 40 and the beveled seat 16 of the clutch member 6 are firmly urged together causing the band to be compressed into groove 39 of the hub part 38. This action occurs when the clutch elements 2 and 3 are free with respect to each other and while the clutch member 24 is being rotated by the shaft 12 and road wheels of the vehicle. Engagement between the synchronizing band 40 and the inner periphery of the recess 14 forms a frictional driving connection between the driving clutch member 6 and normally driven clutch member 24 which synchronizes the rotation of the driving clutch member 6 and the driven clutch member 24, thereby permitting further leftward movement of the clutch member 24 to bring the teeth 34 and 17 together without grinding the latter.

The band 40 operates internally upon the driving clutch member 6 and it tends to unwrap during slight relative rotation of the driving and driven clutch members causing the frictional force between the contacting surfaces of the band and member 6 to be augmented. This self energizing action of the band 40 produces a frictional driving connection without relying upon the resiliency of springs or other members.

Although but two specific embodiments of this invention have herein been shown and described, it will be understood that various changes including the size, shape and arrangement of parts may be made without departing from the spirit of my invention and it is not my intention to limit its scope other than by the terms of the appended claims.

I claim:

1. In transmission mechanism having driving and driven shafts, separable positive driving and driven elements on said driving and driven shafts respectively, an internal cylindrical seat on one of said elements and a self energizing friction band on the other element engageable with said internal seat having a relaxed diameter exceeding the internal diameter of said seat, said band being contractible and receivable within said seat for forming a frictional driving connection between said elements before the latter are engaged together in a normal driving relation.

2. In transmission mechanism, a driven member having an axially extending hub part, a driving member having an end recess for receiving said hub part and adapted to positively drive said driven member, a self energizing frictional driving element on said hub part comprising a split band, a seat on the inner periphery of said recess having a smaller internal diameter than the relaxed diameter of said band and adapted to contract the latter when said driving and driven members approach each other, and means for limiting relative rotation of said band with respect to said hub part so as to expand said band by relative rotation of said driving and driven members, thereby forming a self energizing driving connection between said members.

3. In a transmission having separable positive driving and driven clutch members, an internal beveled seat formed on one of said members, an axially extending hub part on the other member having a peripheral groove therein, a split band in said groove engageable with said seat, and means in said groove for limiting relative rotation of said band with respect to said hub part so as to expand said band by relative rotation of said members, thereby forming a self energizing driving connection between said members.

4. In transmission mechanism, driving and driven shafts, a driving clutch member having a peripheral flange overhanging one end thereof, clutch teeth on the outer periphery of said flange, a driven clutch member shiftably mounted on said driven shaft having a hub in registration with the interior of said flange, a band on said hub for forming a frictional driving connection between said clutch members and a peripheral flange on said driven clutch member having internal teeth thereon for coacting with the teeth of said driving clutch member so as to form a positive driving connection between said members.

5. In transmission mechanism, driving and driven parts, driving and driven clutch members on said driving and driven parts respectively, an internal substantially annular seat on one of said clutch members, a self-energizing frictional driving element movably mounted on the other clutch member and frictionally engageable with said annular seat, and means coacting between said element and the clutch member on which it is mounted for limiting rotation of said element relative to said latter clutch member and increasing the force of friction between said element and said seat.

6. In transmission mechanism, driving and driven parts, driving and driven clutch members on said driving and driven parts, respectively, an internal substantially annular seat on one of said clutch members, a self-energizing frictional driving element on the other clutch member engageable with said seat and comprising a split band having substantially spaced extremities, and a lug on the latter clutch element disposed between the extremities of said band for limiting rotation thereof in opposite directions relative to the clutch member on which it is mounted and increasing the force of friction between said band and said seat.

WALTER P. COUSINO.